(12) United States Patent
Yamamoto

(10) Patent No.: US 12,179,349 B2
(45) Date of Patent: Dec. 31, 2024

(54) MOTION DATA GENERATION SYSTEM, MOTION DATA GENERATION METHOD, AND MOTION DATA GENERATION PROGRAM OF ROBOT

(71) Applicant: TOYOTA JIDOSHA KABUSHIKI KAISHA, Toyota (JP)

(72) Inventor: Kazuya Yamamoto, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 415 days.

(21) Appl. No.: 17/701,876

(22) Filed: Mar. 23, 2022

(65) Prior Publication Data

US 2022/0305640 A1 Sep. 29, 2022

(30) Foreign Application Priority Data

Mar. 25, 2021 (JP) ................................. 2021-051969

(51) Int. Cl.
*B25J 9/00* (2006.01)
(52) U.S. Cl.
CPC ........... *B25J 9/0072* (2013.01); *B25J 9/0045* (2013.01)
(58) Field of Classification Search
CPC . B25J 9/0072; B25J 5/00; B25J 9/0006; B25J 9/1664
See application file for complete search history.

(56) References Cited

U.S. PATENT DOCUMENTS

2003/0229419 A1* 12/2003 Ishida .................. B62D 57/032
700/247

FOREIGN PATENT DOCUMENTS

JP 2012-223864 A 11/2012

OTHER PUBLICATIONS

Human-like compliant locomotion: state of the art of robotic implementations, Diego Torricelli et al 2016 (hereinafter referred to as Torricelli) (Year: 2016).*

* cited by examiner

*Primary Examiner* — Ian Jen
*Assistant Examiner* — Renee LaRose
(74) *Attorney, Agent, or Firm* — Oliff PLC

(57) ABSTRACT

A motion data generation system of a robot including an upper body, a waist, and a lower body is provided. The motion data generation system includes a subject motion data acquisition unit that acquires upper body motion data captured from motion of the upper body of a subject and captured waist motion data captured from motion of the waist of the subject, a manually generated motion data acquisition unit that acquires lower body motion data and manually generated waist motion data, the lower body motion data and the manually generated waist motion data being generated through manual input by a user, and a robot motion control unit. The robot motion control unit includes a leg state determination unit and a waist motion data generation unit.

4 Claims, 6 Drawing Sheets

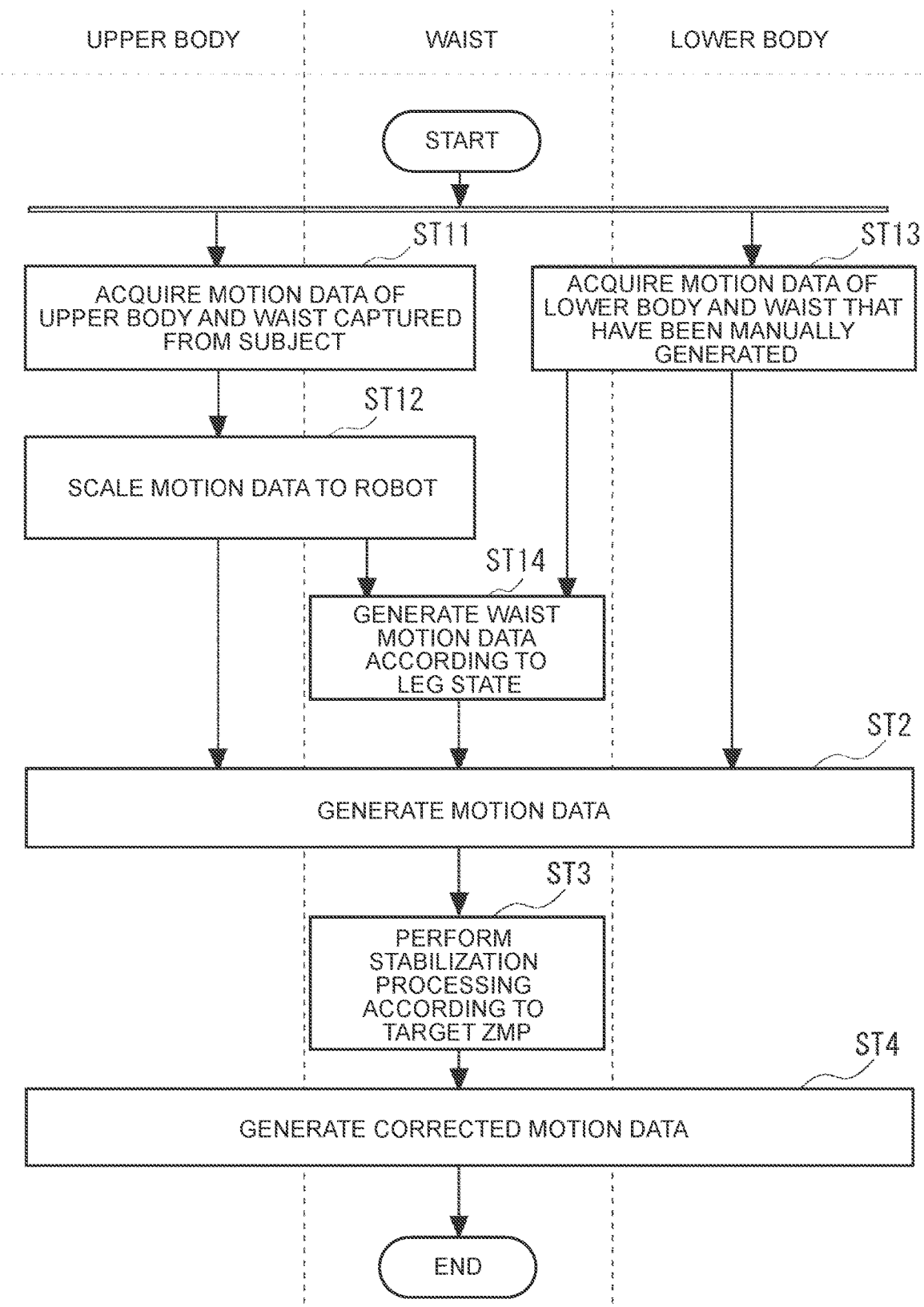

MOTION DATA GENERATION SYSTEM, MOTION DATA GENERATION METHOD, AND MOTION DATA GENERATION PROGRAM OF ROBOT

CROSS-REFERENCE TO RELATED APPLICATION

This application claims priority to Japanese Patent Application No. 2021-051969 filed on Mar. 25, 2021, incorporated herein by reference in its entirety.

BACKGROUND

1. Technical Field

The present disclosure relates to a motion data generation system, a motion data generation method, and a motion data generation program of a robot, and particularly a motion data generation system, a motion data generation method, and a motion data generation program of a humanoid robot.

2. Description of Related Art

In a motion data generation system disclosed in Japanese Unexamined Patent Application Publication No. 2012-223864 (JP 2012-223864 A), motion data is acquired from motion of a subject. A humanoid robot can operate based on this motion data.

SUMMARY

The inventors of the present application have discovered the following issue.

A robot may be required to be operated at maximum performance of the robot itself depending on the part of the robot. In the motion data generated by the motion data generation system described above, motion of the robot is limited by motion of a subject. Therefore, depending on the part of the robot, it may not be possible to realize motion in which performance of the robot itself is fully demonstrated.

The present disclosure has been made in view of such an issue, and an object of the present disclosure is to provide a motion data generation system, a motion data generation method, and a motion data generation program of a robot, which generate motion data that enable motion in which performance of the robot itself is fully demonstrated.

The motion data generation system of the robot according to the present disclosure is a motion data generation system of a robot including an upper body, a waist, and a lower body. The motion data generation system includes a subject motion data acquisition unit that acquires upper body motion data captured from motion of the upper body of a subject and captured waist motion data captured from motion of the waist of the subject, a manually generated motion data acquisition unit that acquires lower body motion data and manually generated waist motion data, the lower body motion data and the manually generated waist motion data being generated through manual input by a user, a robot motion control unit that includes a leg state determination unit and a waist motion data generation unit. The leg state determination unit determines whether at least one leg of the robot is in a swing state or both legs of the robot are in a stance state. When the leg state determination unit determines that at least the one leg of the robot is in the swing state, the waist motion data generation unit generates the manually generated waist motion data as robot waist motion data. When the leg state determination unit determines that the both legs of the robot are in the stance state, the waist motion data generation unit generates the captured waist motion data as the robot waist motion data. The robot motion control unit controls the upper body, the waist, and the lower body of the robot based on the upper body motion data, the robot waist motion data, and the lower body motion data, respectively.

According to such a configuration, when at least the one leg of the robot is in the swing state, the waist of the robot is operated based on the manually generated waist motion data. Therefore, the robot does not easily lose its balance, and it is possible to operate the robot according to the performance of the robot itself.

In a transition period for transitioning from a stance phase in which the both legs of the robot are in the stance state to a swing phase in which at least the one leg of the robot is in the swing state, the waist motion data generation unit may generate the robot waist motion data by combining the manually generated waist motion data and the captured waist motion data.

According to such a configuration, the robot waist motion data in the transition period is composite data of the manually generated waist motion data and the captured waist motion data. Therefore, significant displacement of the waist position of the robot is suppressed with respect to the upper body and the lower body of the robot. That is, unnatural motion of the waist of the robot is suppressed.

In the robot waist motion data generated by the composite data, a reference ratio for referring to the manually generated waist motion data may be gradually increased with respect to the captured waist motion data from start to end of the transition period.

According to such a configuration, in the transition period, it is possible to transition to the swing phase while ensuring the characteristics of the waist motion based on the captured waist motion data. Therefore, significant displacement of the waist position of the robot is suppressed with respect to the upper body and the lower body of the robot.

The motion data generation method according to the present disclosure is a motion data generation method of a robot to be executed in a motion data generation system of the robot including an upper body, a waist, and a lower body. The motion data generation method includes a step of acquiring upper body motion data captured from motion of the upper body of a subject and captured waist motion data captured from motion of the waist of the subject, a step of acquiring lower body motion data and manually generated waist motion data, the lower body motion data and the manually generated waist motion data being generated through manual input by a user, a step of determining whether at least one leg of the robot is in a swing state or both legs of the robot are in a stance state, a step of generating the manually generated waist motion data as robot waist motion data when determination is made that at least the one leg of the robot is in the swing state, and generating the captured waist motion data as the robot waist motion data when determination is made that the both legs of the robot are in the stance state, and a step of controlling the upper body, the waist, and the lower body of the robot based on the upper body motion data, the robot waist motion data, and the lower body motion data, respectively.

According to such a configuration, when at least the one leg of the robot is in the swing state, the waist of the robot is operated based on the manually generated waist motion data. Therefore, the robot does not easily lose its balance, and it is possible to operate the robot according to the performance of the robot itself.

A motion data generation program according to the present disclosure is a motion data generation program of a robot to be executed by a computer operating as an arithmetic device in a motion data generation system of the robot including an upper body, a waist, and a lower body. The motion data generation program causes the computer to execute a step of acquiring upper body motion data captured from motion of the upper body of a subject and captured waist motion data captured from motion of the waist of the subject, a step of acquiring lower body motion data and manually generated waist motion data, the lower body motion data and the manually generated waist motion data being generated through manual input by a user, a step of determining whether at least one leg of the robot is in a swing state or both legs of the robot are in a stance state, a step of generating the manually generated waist motion data as robot waist motion data when determination is made that at least the one leg of the robot is in the swing state, and generating the captured waist motion data as the robot waist motion data when determination is made that the both legs of the robot are in the stance state, and a step of controlling the upper body, the waist, and the lower body of the robot based on the upper body motion data, the robot waist motion data, and the lower body motion data, respectively.

According to such a configuration, when at least the one leg of the robot is in the swing state, the waist of the robot is operated based on the manually generated waist motion data. Therefore, the robot does not easily lose its balance, and it is possible to operate the robot according to the performance of the robot itself.

The present disclosure can provide a motion data generation system, a motion data generation method, and a motion data generation program of a robot, which generate motion data that enable motion in which performance of the robot itself is fully demonstrated.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 is a flowchart showing an example of motion of the motion data generation system according to the first embodiment.

DETAILED DESCRIPTION OF EMBODIMENTS

Hereinafter, a specific embodiment to which the present disclosure is applied will be described in detail with reference to the drawings. However, an applicable embodiment of the present disclosure is not limited to the following embodiment. Further, in order to clarify the explanation, the following description and drawings have been simplified as appropriate.

First Embodiment

Figure 1:
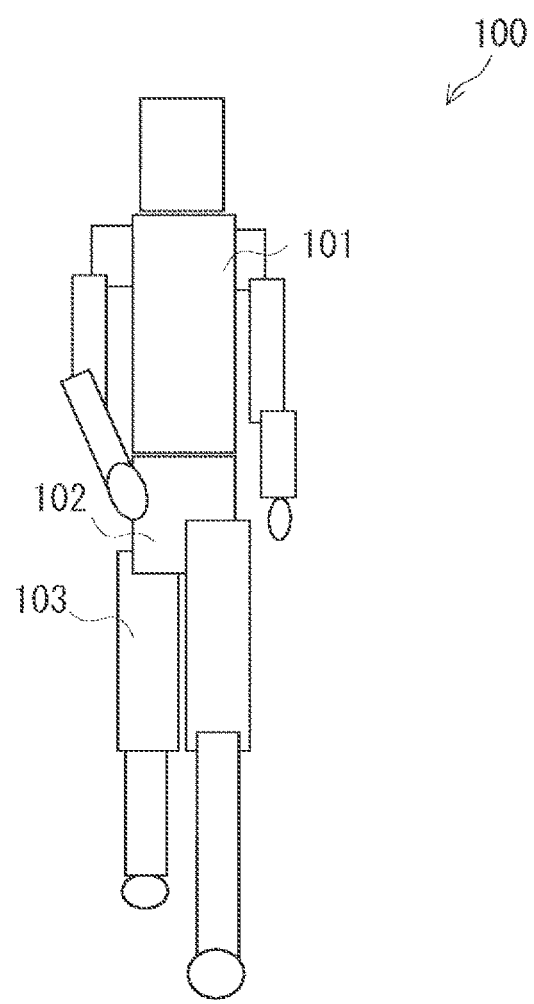
FIG. 1 is a schematic diagram showing a configuration example of a robot to be controlled by a motion data generation system according to a first embodiment.

A first embodiment will be described with reference to FIGS. 1 to 4. FIG. 1 is a schematic diagram showing a configuration example of a robot to be controlled by a motion data generation system according to the first embodiment.

As shown in FIG. 1, a robot 100 includes a lower body 103, a waist 102, and an upper body 101.

The lower body 103 may include at least two legs. The lower body 103 according to the first embodiment has a configuration corresponding to each of upper legs, lower legs, and feet of a person. The lower body 103 supports the waist 102 and the upper body 101. The lower body 103 may include two legs, but may include three or more legs.

The waist 102 connects the lower body 103 and the upper body 101. The waist 102 causes the posture to be changed, for example. The posture includes a three-dimensional position and rotation of the joint.

The upper body 101 may have a configuration corresponding to at least one of a head, a neck, a torso, arms, hands, and fingers of a person. The upper body 101 according to the first embodiment has a configuration corresponding to each of the head, the torso, the arms, and the hands of a person.

Figure 2:
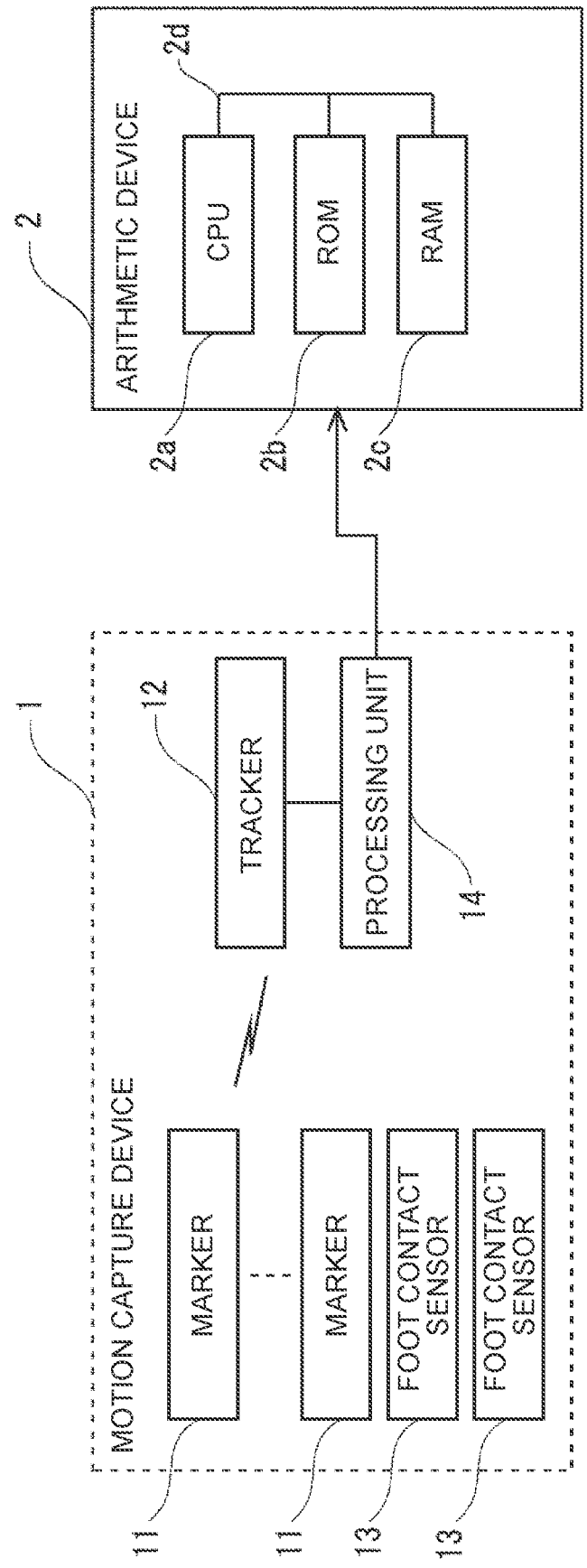
FIG. 2 is a block diagram showing a schematic system configuration of the motion data generation system according to the first embodiment.

FIG. 2 is a block diagram showing a schematic system configuration of the motion data generation system according to the first embodiment. A motion data generation system 10 according to the first embodiment includes a motion capture device 1 and an arithmetic device 2. The motion capture device 1 acquires motion data from motion of a subject. The arithmetic device 2 generates motion data of a humanoid robot (humanoid robot) such as a bipedal walking robot based on the motion data acquired by the motion capture device 1. The motion data generation system 10 can generate natural motion data of a humanoid robot that is closer to the motion of the subject.

The motion capture device 1 may be any device that acquires positions of the respective joints of the upper body and the waist of the subject. The motion capture device 1 may also acquire angles of the respective joints of the upper body and the waist of the subject. A tracker, a sensor, a camera image, or the like may be used for the motion capture device 1. The motion capture device 1 according to the first embodiment includes a plurality of markers 11, a tracker 12 for detecting a position of each marker 11, a plurality of foot contact sensors 13, and a processing unit 14 for processing motion of each marker 11 detected by the tracker 12 and an output signal from the foot contact sensor 13 (floor reaction force information, etc.).

Figure 4:
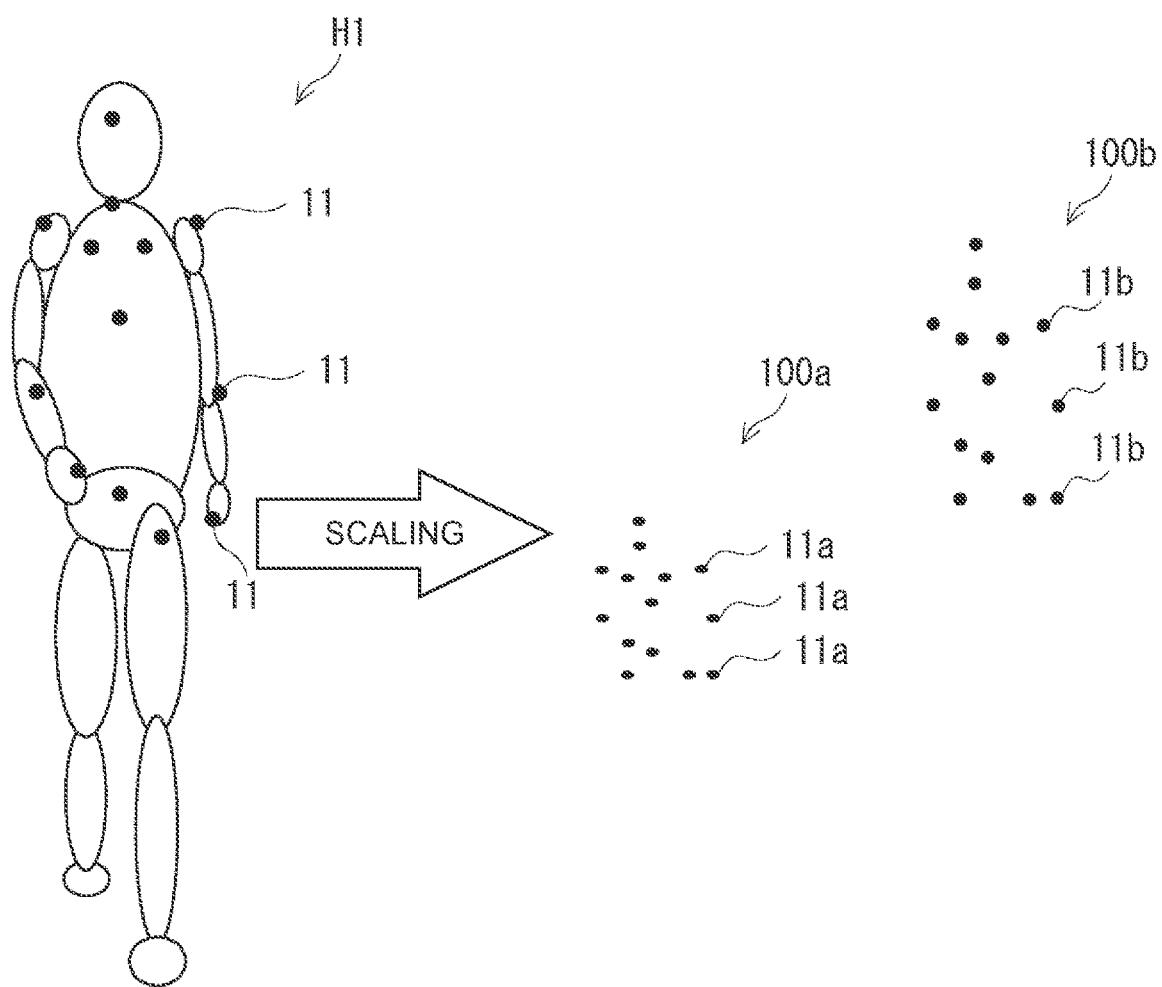
FIG. 4 is a diagram showing positions of markers attached to a subject and a state in which each marker position has been retargeted for a small-sized humanoid robot or a long-legged humanoid robot.

Each marker 11 is attached to a focused part where motion of a subject H1 is measured (captured) (see FIG. 4). The focused parts include at least the upper body and the waist of the subject H1, and include, for example, elbows, shoulders, a head, arms, a neck, hands, and fingers of the subject H1. The tracker 12 detects the position of each marker 11 in a predetermined cycle, and the position of each marker 11 detected by the tracker 12 is input to the processing unit 14. As described above, the motion data of the focused parts of the subject are acquired. The processing unit 14 performs predetermined processing on the detected position data of the marker 11 and outputs the processed motion data (motion capture data) to the arithmetic device 2.

Figure 3:
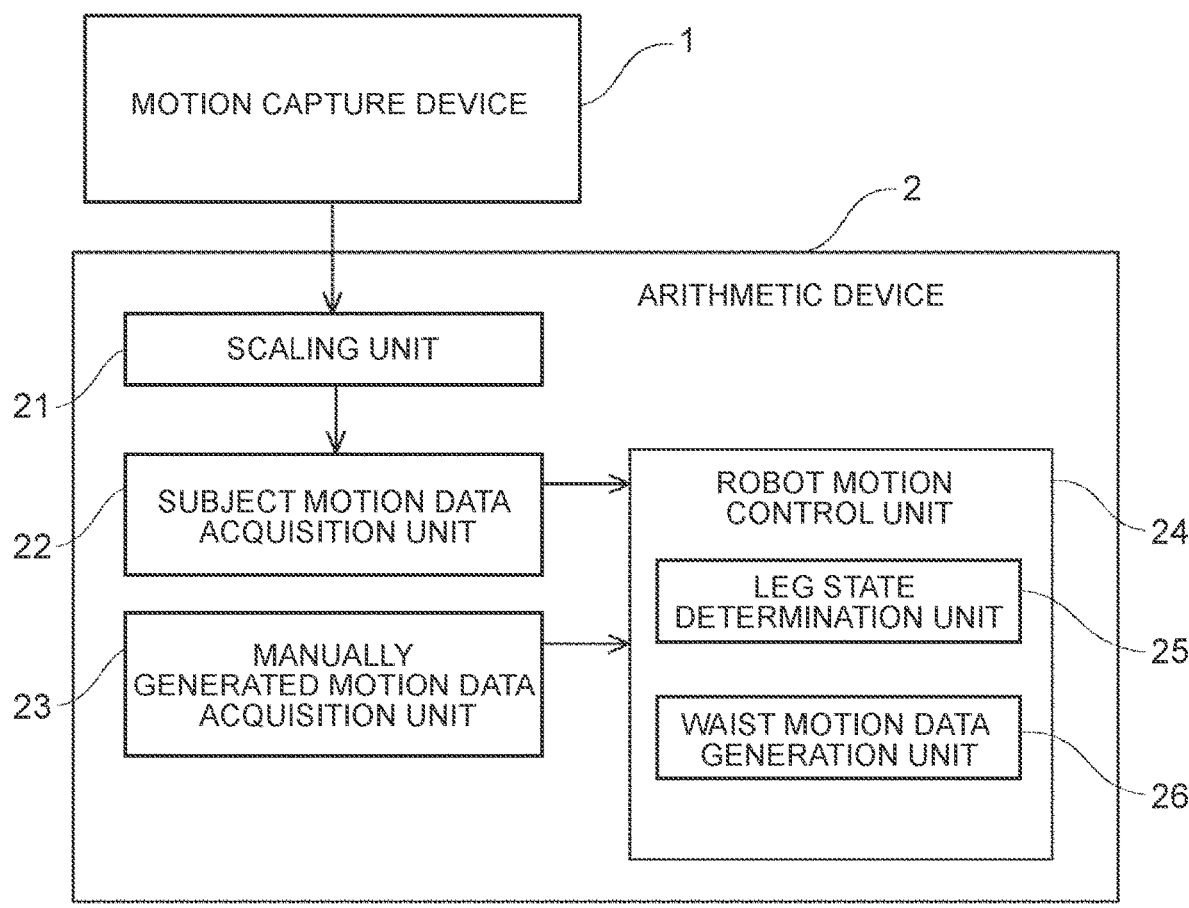
FIG. 3 is a block diagram showing a schematic system configuration of an arithmetic device of the motion data generation system according to the first embodiment.

The arithmetic device 2 generates natural humanoid robot motion data that is closer to the motion of the subject based on the motion data of the subject acquired by the motion capture device 1. FIG. 3 is a block diagram showing a schematic system configuration of the arithmetic device 2 of the motion data generation system 10 according to the first embodiment. The arithmetic device 2 according to the first embodiment includes a scaling unit 21, a subject motion data acquisition unit 22, a manually generated motion data acquisition unit 23, and a robot motion control unit 24.

The arithmetic device 2 may further include at least one of a data correction unit, a first inverse kinematics arithmetic unit, a target zero moment point (ZMP) calculation unit, a target center of gravity trajectory calculation unit, and a second inverse kinematics arithmetic unit, as appropriate. The data correction unit performs correction processing for a ground contact state of toes and the like on the motion data on which the scaling unit 21 has performed retargeting processing. The first inverse kinematics arithmetic unit performs inverse kinematics arithmetic operations on the whole body of the humanoid robot based on the motion data on which the retargeting processing and correction processing have been performed, and calculates each joint angle sequence of the humanoid robot (time series data of each joint angle). Further, the first inverse kinematics arithmetic unit calculates the ZMP trajectory, the center of gravity trajectory, the angular momentum trajectory of the center of gravity, and the like of the humanoid robot before dynamic stabilization based on the calculated joint angle sequences. The target ZMP calculation unit is a specific example of the target ZMP calculation means, and calculates the target ZMP trajectory for stabilizing the motion of the humanoid robot based on the ZMP trajectory calculated by the first inverse kinematics arithmetic unit. The target center of gravity trajectory calculation unit is a specific example of the target center of gravity trajectory calculation means, and calculates the target center of gravity trajectory based on the ZMP trajectory calculated by the first inverse kinematics arithmetic unit and the target ZMP trajectory calculated by the target ZMP calculation unit. The second inverse kinematics arithmetic unit is a specific example of the second inverse kinematics arithmetic means, and based on the target center of gravity trajectory calculated by the target center of gravity trajectory calculation unit, performs the inverse kinematics arithmetic operations on the whole body of the humanoid robot, and calculates each joint angle sequence of the humanoid robot. Each joint angle sequence of the humanoid robot thus calculated can be used as part of the motion data.

The arithmetic device 2 is provided with the hardware configuration based on a microcomputer including, for example, a central processing unit (CPU) 2a for performing arithmetic processing and the like, a read-only memory (ROM) 2b in which arithmetic programs and the like to be executed by the CPU 2a are stored, and a random access memory (RAM) for temporarily storing processing data and the like. Further, the CPU 2a, the ROM 2b, and the RAM 2c are connected to each other by a data bus 2d.

The scaling unit 21 is a specific example of the scaling means, and performs well-known retargeting processing on the motion data from the motion capture device 1 in order to adapt the motion data of the subject to the humanoid robot that is actually operated. The motion data acquired by the motion capture device 1 is motion based on the length of each part of the subject, and the retargeting processing is performed on the motion data since information on the focused parts (for example, the position and the posture of the upper body and waist and the angle of any joint to be used as the motion data) cannot be adapted to the humanoid robot as it is.

For example, the scaling unit 21 determines the magnification of each link of the humanoid robot from the ratio of each link length of the humanoid robot to be applied and the length of the corresponding part of the subject, and performs the retargeting processing.

For example, as shown in FIG. 4, in a case where the retargeting processing is performed on the position of each marker 11 attached to the subject H1 (the position of the focused part), each marker 11a corresponding to each marker 11 in the motion data approaches each other when the robot 100a that is an example of the robot 100 is small. Further, the robot 100b that is an example of the robot 100 has long legs. Each marker 11b corresponding to each marker 11 in the motion data of the robot 100b is separated from each other as compared with that in the motion data of the robot 100a.

The subject motion data acquisition unit 22 acquires the motion data on which the scaling unit 21 has performed the retargeting processing. The acquired motion data includes upper body motion data captured from motion of the upper body of the subject H1 and captured waist motion data captured from motion of the waist of the subject H1.

The manually generated motion data acquisition unit 23 acquires lower body motion data and manually generated waist motion data generated through manual input by a user. The lower body motion data and the manually generated waist motion data may be acquired from the ROM 2b of the arithmetic device 2, or may be acquired through manual input by the user via an interface or the like. This lower body motion data includes a step pattern, foot posture, and posture of the waist 102 that establishes these.

The robot motion control unit 24 controls the upper body 101, the waist 102, and the lower body 103 of the robot 100. The robot motion control unit 24 includes a leg state determination unit 25 and a waist motion data generation unit 26.

Here, there is a swing phase in which at least one leg of the robot 100 is in a swing state while the robot 100 is operated. In addition, there is a stance phase in which both legs of the robot 100 are in a stance state. In many cases, the swing phase and the stance phase are alternately repeated while the robot 100 is operated.

The leg state determination unit 25 determines whether at least one leg of the robot 100 is in a swing state or both legs of the robot 100 are in a stance state. Specifically, the leg state determination unit 25 can determine whether at least one leg of the robot 100 is in a swing state based on the lower body motion data acquired by the manually generated motion data acquisition unit 23. More specifically, the leg state determination unit 25 determines whether at least one leg of the robot 100 is in a swing state for each time according to the time in the lower body motion data. The leg state determination unit 25 determines whether at least one leg of the robot 100 is in a swing state, and estimates whether at least one leg of the robot 100 is in a swing phase or both legs of the robot 100 are in a stance phase at the current time.

When the leg state determination unit 25 determines that at least one leg of the robot 100 is in a swing state, the waist motion data generation unit 26 selects the manually generated waist motion data, and generates the manually generated waist motion data as robot waist motion data. On the other hand, when the leg state determination unit 25 determines that both legs of the robot 100 are in a stance state, the waist motion data generation unit 26 selects the captured waist motion data, and generates the captured waist motion data as the robot waist motion data.

The robot motion control unit 24 operates the waist 102 of the robot 100 based on the robot waist motion data. In other words, the robot motion control unit 24 operates the waist 102 based on the manually generated waist motion data during the swing phase. In addition, the robot motion control unit 24 operates the waist 102 based on the captured waist motion data during the stance phase. In a transition period for transitioning from the stance phase to the swing phase, the robot motion control unit 24 may smoothly transition the motion of the waist 102 from the motion based on the captured waist motion data to the motion based on the manually generated waist motion data. The transition period may be provided on the stance phase side.

Figure 5:
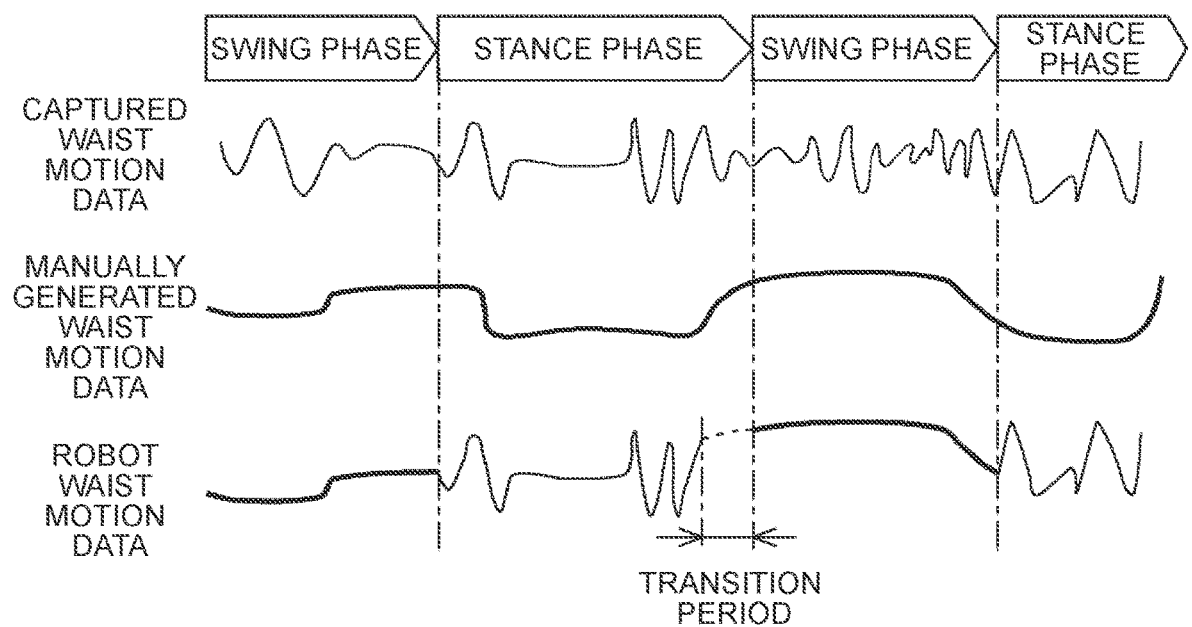
FIG. 5 is a diagram showing an example of robot waist motion data in the motion data generation system according to the first embodiment.

FIG. 5 is a diagram showing an example of the robot waist motion data in the motion data generation system according to the first embodiment. As shown in FIG. 5, the waist 102 is operated based on the manually generated waist motion data during the swing phase in principle. On the other hand, the waist 102 is operated based on the captured waist motion data in the stance phase in principle. Further, in the transition period, the waist 102 is operated so as to smoothly transition from the motion based on the captured waist motion data to the motion based on the manually generated waist motion data.

The waist motion data generation unit 26 may generate the robot waist motion data by combining the manually generated waist motion data and the captured waist motion data. The robot motion control unit 24 may operate the waist 102 based on the robot waist motion data generated by this composite data in the transition period for transitioning from the stance phase to the swing phase. As a result, it is possible to suppress a sudden change in the position of the waist 102 due to the displacement of the waist 102 of the robot 100 during the transition period. That is, unnatural motion of the waist 102 is suppressed.

As a specific example of a method of generating composite data, there is a method of generating composite data in which the ratio of referring to the captured waist motion data or the manually generated waist motion data (hereinafter referred to as a reference ratio) is increased or reduced with respect to the position of the waist 102 in the transition period. The time when the transition period starts is set as the transition period start time $t_s$, and the time when the transition period ends is set as the transition period end time $t_e$. Specifically, at the transition period start time $t_s$, the reference ratio for referring to the captured waist motion data is set high with respect to the manually generated waist motion data. From the transition period start time $t_s$ to the transition period end time $t_e$, the reference ratio for referring to the manually generated waist motion data is gradually increased with respect to the captured waist motion data. In a specific example of the method of generating the composite data, in the transition period of the composite data, it may be possible to transition to the swing phase while characteristics of the motion of the waist 102 based on the captured waist motion data are kept to some extent.

In a specific example of the method of generating the composite data, linear interpolation can be used. As a specific example of the linear interpolation, there is a method of obtaining the posture Pt of the waist 102 of the robot 100 by using the following formula (1). In other words, a relationship between the posture Pt of the waist 102 of the robot 100, the transition period start time $t_s$, the transition period end time $t_e$, the posture Pht of the waist 102 based on the manually generated waist motion data, and the posture Pct of the waist 102 based on the captured waist motion data is shown by the following formula (1).

[Formula 1]

$$Pt = \frac{t - t_s}{t_e - t_s} Pht + \left(1 - \frac{t - t_s}{t_e - t_s}\right) P_{ct} \qquad (1)$$

When the phase is switched from the swing phase to the stance phase, the robot motion control unit 24 obtains the posture Prt of the waist 102 using the motion of the waist 102 based on the manually generated waist motion data as a reference. In such a case, a relationship between the posture Prt of the waist 102 at the time t, the posture $Prt_c$ of the waist 102 at the switching time $t_c$ for switching from the swing phase to the stance phase, a constant A for standardizing the waist posture of the subject H1 to a size of the robot 100, the posture Pht of the waist 102 based on the captured waist motion data at the time t, and the posture $Pht_c$ of the waist 102 based on the captured motion data at the switching time $t_c$ is shown by the following formula (2). That is, the posture Prt of the waist 102 can be obtained by using the following formula (2).

[Formula 2]

$$Prt = Prt_c + A(Pht - Pht_c) \qquad (2)$$

The robot motion control unit 24 generates the motion data by combining the upper body motion data acquired by the subject motion data acquisition unit 22, the lower body motion data acquired by the manually generated motion data acquisition unit 23, the manually generated waist motion data, the captured waist motion data, and the composite data.

Further, the robot motion control unit 24 may perform stabilization processing on the front-rear and right-left direction components of the robot 100 in the posture Prt of the waist 102 according to the target ZMP trajectory to correct the motion data. As described above, the target ZMP trajectory can be obtained when the arithmetic device 2 includes the data correction unit, the first inverse kinematics arithmetic unit, the target ZMP calculation unit, and the like. The robot motion control unit 24 generates a control signal based on the motion data, and sends the control signal to the upper body 101, the waist 102, and the lower body 103 of the robot 100. The upper body 101, the waist 102, and the lower body 103 can be operated based on the control signal.

Example of Motion

Next, an example of the motion of the motion data generation system according to the first embodiment will be described with reference to FIG. 6. FIG. 6 is a diagram showing an example of a method of generating a waist posture in an example of the motion in the motion data generation system according to the first embodiment. In a flowchart shown in FIG. 6, each of three swim lanes is assigned to the upper body, the waist, and the lower body.

The motion capture device 1 acquires the motion data of the upper body and the waist captured from the subject H1 (step ST11). This acquired motion data includes the upper body motion data and the captured waist motion data.

Subsequently, the scaling unit 21 scales the motion data acquired in step ST11 to the body size of the robot 100 (step ST12).

In parallel with steps ST11 and ST12, the manually generated motion data acquisition unit 23 acquires the lower body motion data and the manually generated waist motion data (step ST13).

Subsequently, the waist motion data generation unit 26 generates the waist motion data according to the leg state of the robot 100 (step ST14). Specifically, the leg state determination unit 25 determines the leg state of the robot 100. The waist motion data generation unit 26 generates the waist motion data based on this determination result.

Subsequently, the motion data of the robot 100 is generated (step ST2). Specifically, the motion data of the robot 100 is generated by combining the upper body motion data acquired in step ST11, the lower body motion data acquired in step ST13, and the waist motion data acquired in step ST14.

Further, the robot motion control unit 24 may perform stabilization processing on the front-rear and right-left direction components of the robot 100 in the posture Prt of the waist 102 according to the target ZMP trajectory to correct the motion data (step ST3). In such a case, similarly to step ST12, the corrected motion data of the robot 100 is generated by combining the upper body motion data, the lower body motion data, which have been described above, and the waist motion data corrected in step ST3 (step ST4).

As a result, the motion data of the robot 100 can be generated. The robot motion control unit 24 operates the upper body 101, the waist 102, and the lower body 103 based on the motion data or the corrected motion data.

An applicable embodiment of the present disclosure is not limited to the above embodiment, and can be appropriately modified without departing from the spirit. Further, the present disclosure may be carried out by appropriately combining the above embodiment and examples thereof. The present disclosure can also be realized, for example, by causing the CPU 2a to execute computer programs for the processing shown in FIGS. 5 and 6. The programs described above are stored using various types of non-transitory computer readable media and can be supplied to a computer (a computer including an information notification device). The non-transitory computer-readable media include various types of tangible storage media. Examples of the non-transitory computer-readable media include magnetic recording media (e.g., flexible disks, magnetic tapes, hard disk drives), magneto-optical recording media (e.g., magneto-optical disks). Further, this example includes a compact disc read-only memory (CD-ROM), a compact disc recordable (CD-R), and a compact disc rewritable (CD-R/W). Further, this example includes semiconductor memories (e.g., mask read only memory (ROM), programmable read only memory (PROM), erasable programmable read only memory (EPROM), flash ROM, random access memory (RAM)). The programs may also be supplied to a computer by various types of transitory computer-readable media. Examples of the transitory computer-readable media include electrical signals, optical signals, and electromagnetic waves. The transitory computer-readable media can supply the programs to a computer via a wired communication path such as an electric wire and an optical fiber, or a wireless communication path.

Further, in the various embodiments described above, as described in the processing procedure in the motion data generation system 10, the present disclosure may also take a form as a control method of the motion data generation system 10. Further, it can be said that the above programs are programs for causing the motion data generation system 10 to execute such a control method.

What is claimed is:

1. A motion data generation system of a robot including an upper body, a waist, and a lower body, the motion data generation system comprising:
    a subject motion data acquisition unit that acquires upper body motion data captured from motion of the upper body of a subject and captured waist motion data captured from motion of the waist of the subject;
    a manually generated motion data acquisition unit that acquires lower body motion data and manually generated waist motion data, the lower body motion data and the manually generated waist motion data being generated through manual input by a user; and
    a robot motion control unit that includes a leg state determination unit and a waist motion data generation unit, wherein:
    the leg state determination unit determines whether at least one leg of the robot is in a swing state or both legs of the robot are in a stance state;
    when the leg state determination unit determines that at least the one leg of the robot is in the swing state, the motion data generation unit generates the manually generated waist motion data as robot waist motion data;
    when the leg state determination unit determines that the both legs of the robot are in the stance state, the motion data generation unit generates the captured waist motion data as the robot waist motion data; and
    the robot motion control unit controls the upper body, the waist, and the lower body of the robot based on the upper body motion data, the robot waist motion data, and the lower body motion data, respectively, wherein
    in a transition period for transitioning from a stance phase in which the both legs of the robot are in the stance state to a swing phase in which at least the one leg of the robot is in the swing state, the motion data generation unit generates the robot waist motion data by combining the manually generated waist motion data and the captured waist motion data.

2. The motion data generation system of the robot according to claim 1, wherein in the robot waist motion data generated by composite data, a reference ratio for referring to the manually generated waist motion data is gradually increased with respect to the captured waist motion data from start to end of the transition period.

3. A motion data generation method of a robot to be executed in a motion data generation system of the robot including an upper body, a waist, and a lower body, the motion data generation method comprising:
    a step of acquiring upper body motion data captured from motion of the upper body of a subject and captured waist motion data captured from motion of the waist of the subject;
    a step of acquiring lower body motion data and manually generated waist motion data, the lower body motion data and the manually generated waist motion data being generated through manual input by a user;
    a step of determining whether at least one leg of the robot is in a swing state or both legs of the robot are in a stance state;
    a step of generating the manually generated waist motion data as robot waist motion data when determination is made that at least the one leg of the robot is in the swing state, and generating the captured waist motion data as the robot waist motion data when determination is made that the both legs of the robot are in the stance state;

a step of controlling the upper body, the waist, and the lower body of the robot based on the upper body motion data, the robot waist motion data, and the lower body motion data, respectively; and a step of generating the robot waist motion data by combining the manually generated waist motion data and the captured waist motion data during a transition period for transitioning from a stance phase in which the both legs of the robot are in the stance state to a swing phase in which at least the one leg of the robot is in the swing state.

4. A motion data generation program of a robot to be executed by a computer operating as an arithmetic device in a motion data generation system of the robot including an upper body, a waist, and a lower body, the motion data generation program causing the computer to execute:

a step of acquiring upper body motion data captured from motion of the upper body of a subject and captured waist motion data captured from motion of the waist of the subject;

a step of acquiring lower body motion data and manually generated waist motion data, the lower body motion data and the manually generated waist motion data being generated through manual input by a user;

a step of determining whether at least one leg of the robot is in a swing state or both legs of the robot are in a stance state;

a step of generating the manually generated waist motion data as robot waist motion data when determination is made that at least the one leg of the robot is in the swing state, and generating the captured waist motion data as the robot waist motion data when determination is made that the both legs of the robot are in the stance state;

a step of controlling the upper body, the waist, and the lower body of the robot based on the upper body motion data, the robot waist motion data, and the lower body motion data, respectively; and a step of generating the robot waist motion data by combining the manually generated waist motion data and the captured waist motion data during a transition period for transitioning from a stance phase in which the both legs of the robot are in the stance state to a swing phase in which at least the one leg of the robot is in the swing state.

* * * * *